United States Patent
Muir et al.

(10) Patent No.: US 8,818,698 B2
(45) Date of Patent: Aug. 26, 2014

(54) SYSTEMS AND METHODS FOR TRACKING DATA ASSOCIATED WITH OPERATION OF A POWER TAKE-OFF DEVICE

(75) Inventors: Keith Muir, Vernal, UT (US); Rick Moon, Jensen, UT (US)

(73) Assignee: RN Industries Trucking, Inc., Roosevelt, UT (US)

(*) Notice: Subject to any disclaimer, the term of this patent is extended or adjusted under 35 U.S.C. 154(b) by 0 days.

(21) Appl. No.: 13/554,712

(22) Filed: Jul. 20, 2012

(65) Prior Publication Data
US 2014/0025283 A1    Jan. 23, 2014

(51) Int. Cl.
*G06F 19/00* (2011.01)
(52) U.S. Cl.
USPC .......................................................... 701/123
(58) Field of Classification Search
CPC ......... B60K 6/387; B60K 25/00; B60K 25/06
USPC ....................................................... 701/123
See application file for complete search history.

(56) References Cited

U.S. PATENT DOCUMENTS

| | | | |
|---|---|---|---|
| 4,944,160 A | | 7/1990 | Malone et al. |
| 5,299,129 A | * | 3/1994 | Uchida et al. ................... 701/51 |
| 5,562,173 A | * | 10/1996 | Olson .......................... 180/53.4 |
| 5,616,964 A | | 4/1997 | Peterson, Jr. |
| 6,510,381 B2 | | 1/2003 | Grounds et al. |
| 6,571,168 B1 | * | 5/2003 | Murphy et al. ............... 701/123 |
| 7,399,255 B1 | | 7/2008 | Johnson et al. |
| 2004/0192507 A1 | | 9/2004 | Newman et al. |
| 2008/0221741 A1 | * | 9/2008 | Pillar et al. ........................ 701/1 |
| 2009/0036271 A1 | * | 2/2009 | Brand et al. .................. 477/181 |
| 2009/0044993 A1 | | 2/2009 | Bissontz |

* cited by examiner

*Primary Examiner* — James Trammell
*Assistant Examiner* — Michael D Lang
(74) *Attorney, Agent, or Firm* — Durham Jones & Pinegar Intellectual Property Law Group

(57) ABSTRACT

Exemplary embodiments are directed to systems and methods for tracking data during operation of a power transfer device. A system may include an electrical relay and a switch. The switch may be coupled to each of the electrical relay and a power transfer device and may be configured to couple the electrical relay to a reference voltage upon engagement of the power transfer device. The system may further include a processing unit configured to receive a signal from the electrical relay while the power transfer device is engaged.

22 Claims, 8 Drawing Sheets

SYSTEMS AND METHODS FOR TRACKING DATA ASSOCIATED WITH OPERATION OF A POWER TAKE-OFF DEVICE

BACKGROUND

1. Field

The present invention relates generally to power transfer devices. More specifically, the present invention relates to systems and methods for tracking one or more conditions during operation of a power transfer device.

2. Background

As will be appreciated by a person having ordinary skill in the art, it is frequently desirable in motor carrier operations to employ auxiliary equipment (e.g. sprayers, vacuum pumps, air compressors) for services accessorial to transportation and to have such auxiliary equipment powered by the vehicle engine and not by an independent, "stand-alone" auxiliary motor. This may be accomplished through employment of a power transfer device, such as a power take-off (PTO) device. Well-known in the art, a PTO device is powered directly by the vehicle engine using belt or chain driven cogs and wheels connecting the PTO to the engine. Generally, the vehicle engine is placed in "idle" and the driver then engages the PTO device by means of engagement valves or levers. When operating, the PTO device provides power to auxiliary equipment either by mechanical transmission [e.g., secondary drive or propeller shafts] or hydraulic transmission (e.g., hydraulic pumps mounted directly to the PTO device).

Fuel burned to propel the vehicle on the public highway is assessed a tax separate from a sales tax. This separate tax is commonly called a "Road Tax" or "Fuel Tax". Since PTO devices are operated when the vehicle engine is idling, then fuels consumed to power the PTO device are exempt from the Road or Fuel Tax. Stated simply, PTO fuels do not propel the vehicle over a public highway.

A need exists for methods and systems for tracking data during operation of a power transfer device. More specifically, a need exists for determining an amount of fuel used by an associated vehicle during operation of a power transfer device, determining an amount of time that has elapsed during operation of the power transfer device, or both.

DETAILED DESCRIPTION

Figure 1:
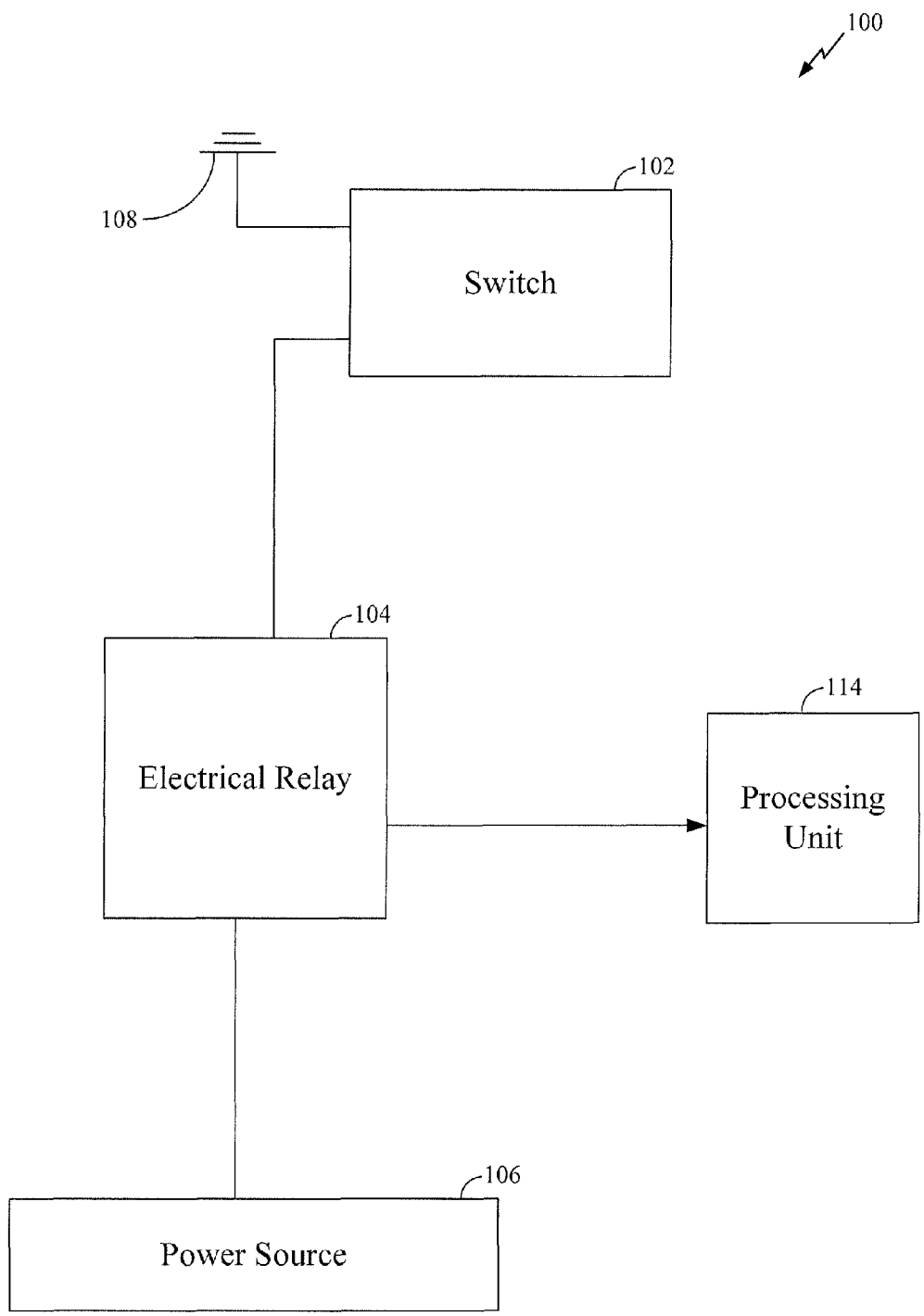
FIG. 1 is a block diagram illustrating a system including an electrical relay, a processing unit, and a switch, according to an exemplary embodiment of the present invention.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Referring in general to the accompanying drawings, various embodiments of the present invention are illustrated to show the structure and methods for a power transfer device. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of the present invention and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Exemplary embodiments, as described herein, are directed to systems and methods for tracking data (e.g., one or more conditions) during operation of a power transfer device. For example, an amount of fuel (e.g. a number of gallons of diesel fuel or a number of gallons of gasoline) used by an vehicle during operation of an associated power transfer device may be determined, an amount of time elapsed during operation of the power transfer device may be determined, or each of an amount of fuel used and an amount of time elapsed during operation of the power transfer device may be determined. The data may then be used for various reasons, such as determining an amount of fuel (e.g. a number of gallons of diesel fuel or a number of gallons of gasoline) that may be exempt from various fuel tax laws.

According to one exemplary embodiment, a system may include an electrical relay and a switch coupled to each of the electrical relay and a power transfer device. The switch may be configured to couple the electrical relay to a reference voltage upon engagement of the power transfer device. In addition, the system may include a processing unit configured to receive a signal from the electrical relay while the power transfer device is engaged. Accordingly, the processing unit may be configured to determine when the power transfer device is in operation and, furthermore, track one or more conditions during operation of the power transfer device.

FIG. 1 is a block diagram of a system 100, according to an exemplary embodiment of the present invention. System 100 includes a switch 102, a power source 106, and an electrical relay 104, which may comprise any known and suitable electrical relay. As will be appreciated by a person having ordinary skill in the art, current flowing through one circuit in an electrical relay may switch on and off a current in a second circuit of the electrical relay. As a non-limiting example, electrical relay 104 may comprise a 12V, five prong electrical relay. Electrical relays are well-known in the art and, therefore, operation of electrical relay 104 will not be described in detail. As illustrated in FIG. 1, switch 102 is coupled to each of a reference voltage (e.g., a ground voltage) 108 and electrical relay 104. For example only, switch 102 may be an air-actuated cylinder or an air pressure electrical switch. Furthermore, electrical relay 104 is coupled to power source 106, which may comprise one or more power sources. By way of example only, power source 106 may comprise a power source (e.g., 12 volt+) from a vehicle (e.g., a tractor). System 100 may also include a processing unit 114 coupled to electrical relay 104 and configured to receive at least one signal (e.g., a current) therefrom. Processing unit 114 may comprise any known and suitable processor, such as a microprocessor. For example only, processing unit 114 may comprise a global positioning system (GPS). As a more specific example, processing unit 114 may comprise a mobile computing platform (e.g., MCP100) developed by Qualcomm Incorporated of San Diego, Calif.

It is noted that while switch 102 is in an "open" configuration, an open circuit may exist between reference voltage 108 and electrical relay 104 and, therefore, an electrical current may not flow from reference voltage 108 to electrical relay 104. Moreover, because current is not flowing from reference voltage 108 to electrical relay 104, a signal may not be transmitted from electrical relay 104 to processing unit 114. Further, while switch 102 is in a "closed" configuration, reference voltage 108 may be coupled to electrical relay 104 and, therefore, electrical current may flow from reference voltage 108 to electrical relay 104. In addition, upon being coupled to reference voltage 108, electrical relay 104 may convey a signal to processing unit 114 indicating that switch 102 is closed.

Figure 2A:
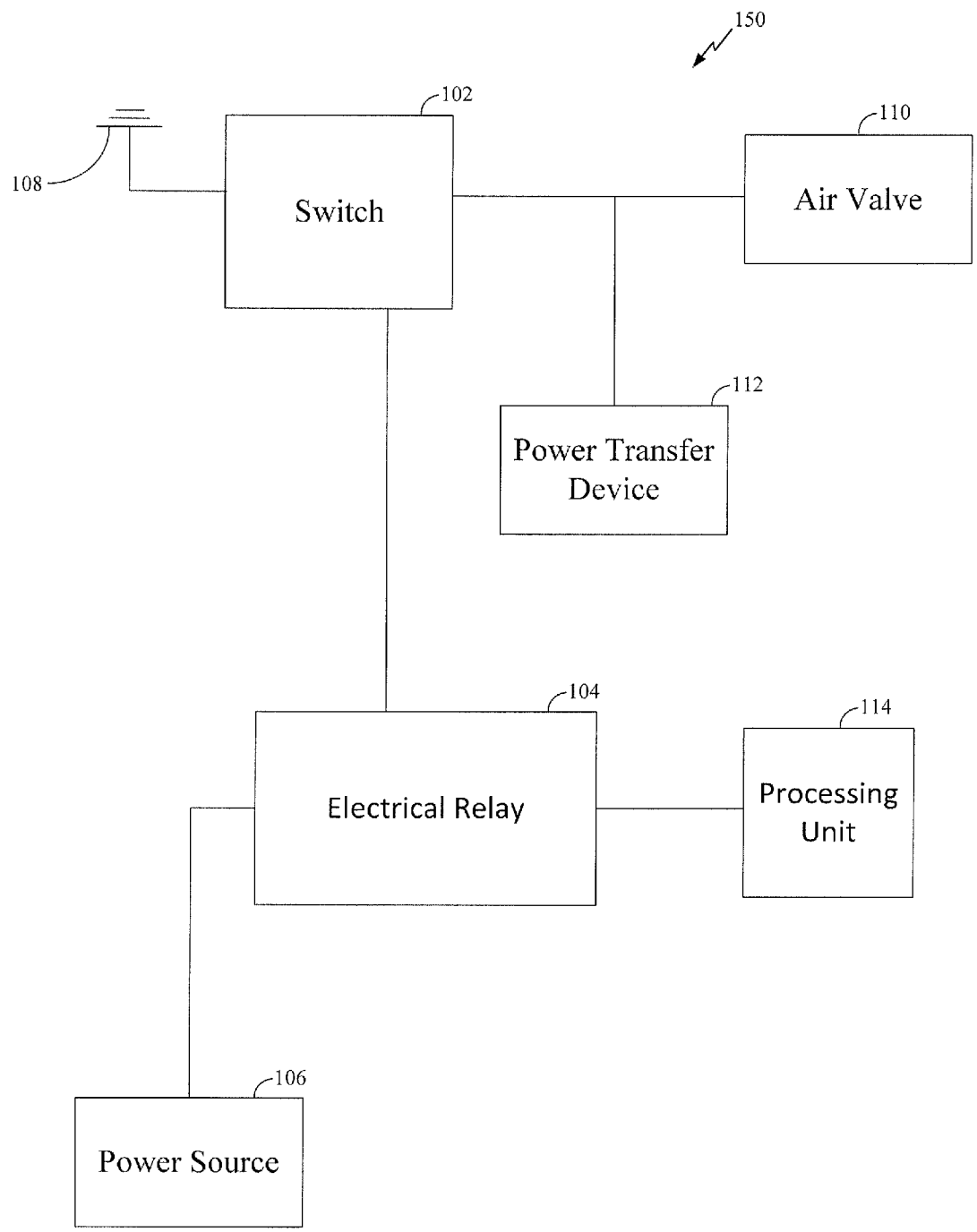
FIG. 2A is a block diagram illustrating a system including an electrical relay, a processing unit, a switch, and a power transfer device, according to an exemplary embodiment of the present invention.

FIG. 2A is an illustration of a system 150, in accordance with an exemplary embodiment of the present invention. Similar to system 100, system 150 includes switch 102, electrical relay 104, processing unit 114, and power source 106. Further, system 150 includes an air valve 110 and a power transfer device 112. By way of example only, power transfer device 112 may comprise a power take-off (PTO) device, a transfer case, or a combination thereof. As illustrated in FIG. 2A, air valve 110 is coupled to each of power transfer device 112 and switch 102. It is noted that power transfer device 112 may be coupled (e.g., mounted) to a gear case (e.g., a transmission) and may be driven by a vehicle engine (not shown in FIG. 2A).

As will be appreciated by a person having ordinary skill in the art, an air valve (e.g., air valve 110) may be used to actuate (i.e., engage) a power transfer device (e.g., power transfer device 112). As will also be appreciated, air valve 110 may be coupled to a lever (not shown in FIG. 2A) configured to be moved by, for example, an operator to engage or disengage power transfer device 112. According to one exemplary embodiment of the present invention, as described more fully below, switch 102 may comprise an air pressure switch. Further, air valve 110 may be configured to convey an adequate amount of air pressure to power transfer device 112, for actuation thereof, and switch 102 to enable switch 102 to close and, thus, couple electrical relay 104 to reference voltage 108. Stated another way, air valve 110 may be coupled to an air supply (not shown in FIG. 2A) and may be configured to convey an adequate amount of air pressure to actuate power transfer device 112 and cause switch 112 to transition from an "open" configuration to a "closed" configuration.

According to one exemplary embodiment of the present invention, switch 102 may transition from an "open" configuration to a "closed" configuration upon engagement of power transfer device 112. Therefore, as an example, while switch 102 is in a "closed" configuration, electrical relay 104 may provide a signal to processing unit 114 indicating that switch 102 is in a closed configuration and, thus, power transfer device 112 is engaged (i.e., in operation).

During a contemplated operation of system 150, power source 106 may provide power to electrical relay 104. Further, while switch 102 is in an open configuration and, thus, electrical relay 104 is isolated from reference voltage 108, processing unit 114 may not receive a signal from electrical relay 104. Further, upon power transfer device 112 being engaged and switch 102 transitioning from an open configuration to a closed configuration, electrical relay 104 may provide a signal to processing unit 114 indicating that reference voltage 108 has been coupled to electrical relay 104.

In contrast to conventional systems, system 150 may reduce, or possibly eliminate, errors (e.g., human and/or equipment errors) associated with tracking one or more conditions during operation of a power transfer device. As one example, conventional systems, which may detect activation of a PTO device via a sensor pin on a PTO device, typically fail due to an inadequate connection between the sensor pin and a ground voltage (i.e., via a sensor wire coupling the sensor pin to the ground voltage). As will be appreciated by a person having ordinary skill, system 150 may not require use of a sensor pin for coupling a power transfer device (e.g., a PTO device) to a ground voltage. Rather, according to one embodiment, a ground voltage may be provided via reference voltage 108. Further, because electrical relay 104 may provide a signal to processing unit 114 upon activation of power transfer device 112 without human interaction, human error associated with tracking one or more conditions during operation of power transfer device 112 may be reduced, and possibly eliminated. In addition, in an embodiment wherein reference voltage 108 comprises a ground voltage, electrical problems (e.g., electrical shortages and/or electrical fires) may also be reduced, and possibly prevented.

Figure 2B:
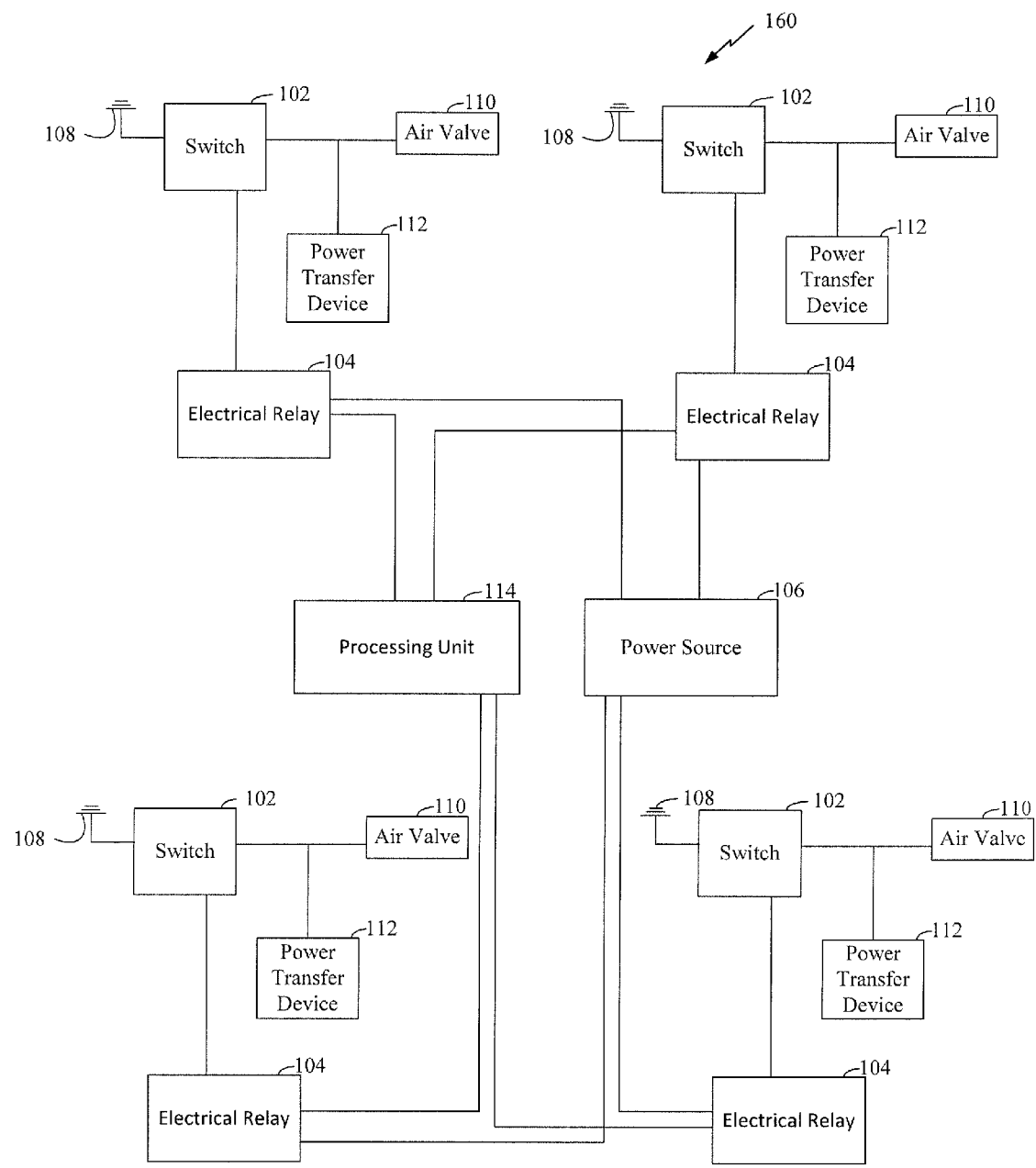
FIG. 2B is a block diagram illustrating a system including a plurality of electrical relays, a processing unit, a plurality of switches, and a plurality of power transfer devices, according to an exemplary embodiment of the present invention.

Although system 150 includes a single power transfer device coupled to a processing unit, the present invention is not so limited. Rather, the present invention may include a system wherein multiple power transfer devices are coupled to a single processing unit. FIG. 2B illustrates a system 160, in accordance with an embodiment of the present invention. System 160 includes processing unit 114 and power source 106. Further, as illustrated in FIG. 2B, power source 106 is coupled to a plurality of electrical relays 104, and each electrical relay 104 is coupled to processing unit 114. Accordingly, each power transfer device 112 of system 160 may be associated with a dedicated air valve 110, a dedicated switch 102 and a dedicated electrical relay 104. Further, each power transfer device 112 of system 160 may share a common power source 106 and a common processing unit 114. It is noted that although system 160 includes four power transfer devices 112 associated with processing unit 114, the invention is not so limited. Rather, system 160 may include any number of power transfer devices associated with a single processing unit.

Figure 3:
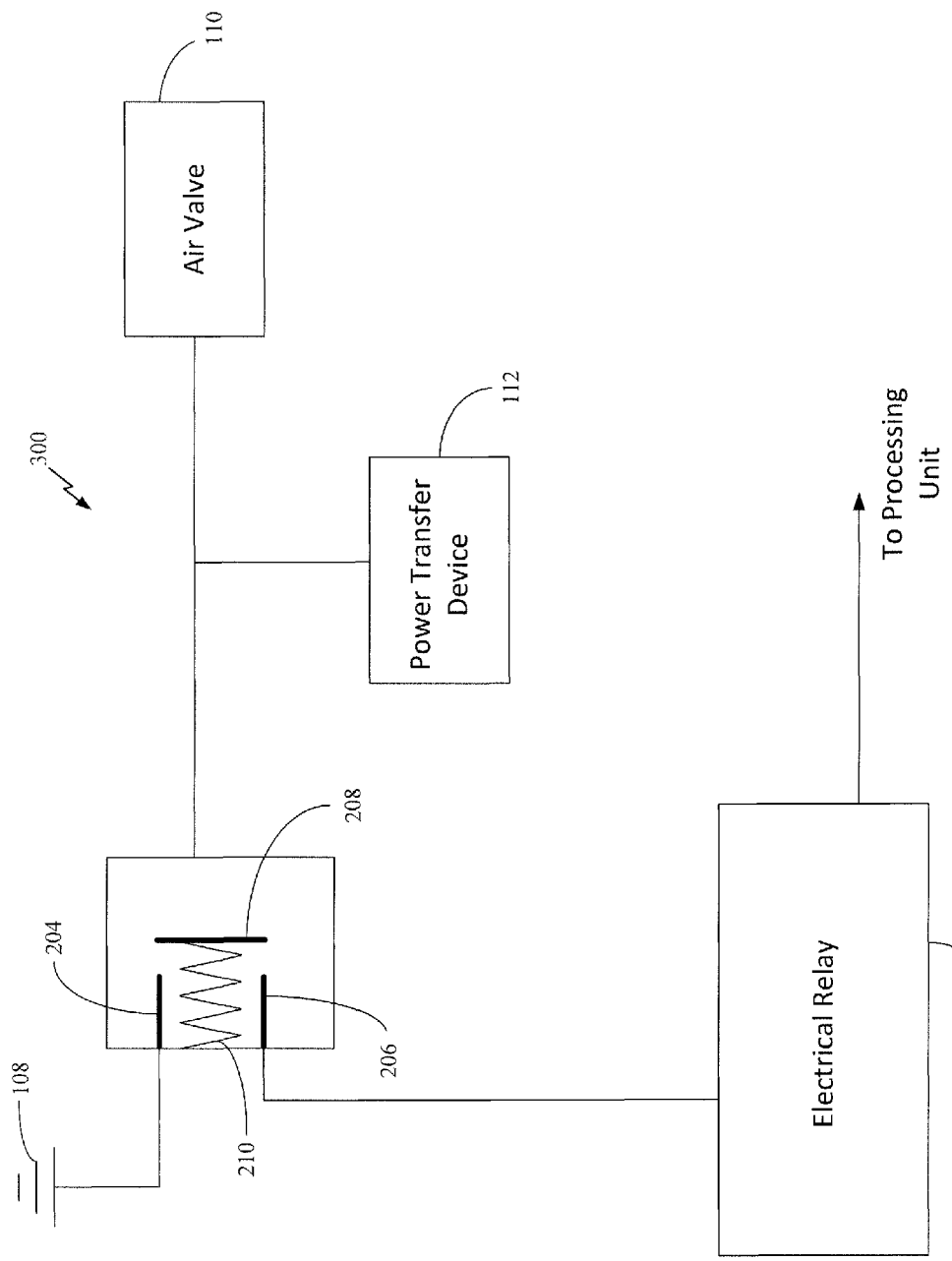
FIG. 3 is a block diagram illustrating a system including an electrical relay, a processing unit, a power transfer device, and an air pressure electrical switch, in accordance with an exemplary embodiment of the present invention.

Another system 300, according to an exemplary embodiment of the present invention, is illustrated in FIG. 3. System 300 includes an electrical relay 104, power source 102 (not shown in FIG. 3; see FIG. 2A), air valve 110, power transfer device 112, and processing unit 114 (not shown in FIG. 3; see FIG. 2A). System 300 also includes a switch 202, which may comprise switch 102 illustrated in FIGS. 1, 2A and 2B. As illustrated in FIG. 3, switch 202 comprises an air pressure electrical switch. According to one embodiment, switch 202 may comprise a "normally open" air pressure switch. Switch 202 comprises a first electrical terminal 204 coupled to reference voltage 108, a second electrical terminal 206 coupled to electrical relay 104, and a third electrical terminal 208 coupled to a spring 210. It is noted that switch 202 defaults to an open configuration in which electrical relay 104 is decoupled from reference voltage 108 and, therefore, current is prevented from flowing from reference voltage 108 to electrical relay 104. Further, as will be appreciated by a person having ordinary skill in the art, upon an adequate amount of air pressure being applied thereto, switch 202 may be configured to close and electrically couple reference voltage 108 to electrical relay 104 via first electrical terminal 204, second electrical terminal 206 and third electrical terminal 208. Upon closing, switch 202 may enable current to flow from reference voltage 108 to electrical relay 104, which may enable electrical relay 104 to convey a signal to processing unit 114. It is noted that the present invention is not limited to air pressure switch 202 illustrated in FIG. 3. Rather, the present invention may utilize any known and suitable pressure switch.

Figure 4:
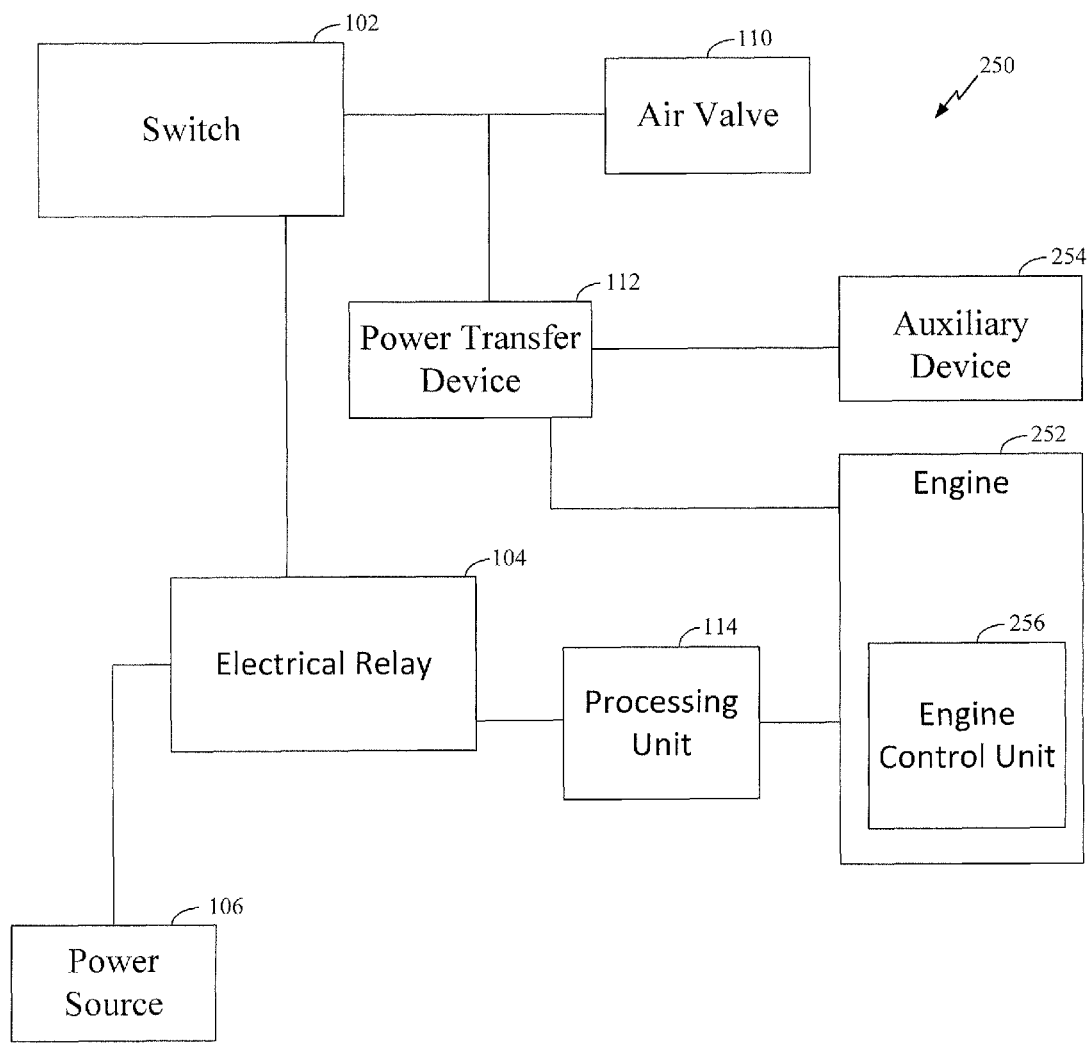
FIG. 4 is a block diagram illustrating a system including an electrical relay, a processing unit, a switch, a power transfer device, an auxiliary device, and an engine, according to an exemplary embodiment of the present invention.

FIG. 4 is an illustration of yet another system 250, according to an exemplary embodiment of the present invention. System 250 includes switch 102, electrical relay 104, processing unit 114, and power source 106, air valve 110 and power transfer device 112. Further, system 250 includes an engine 252 and an auxiliary device 254, each of which are coupled to power transfer device 112. Engine 252 may comprise, for example only, a vehicle engine, such as a tractor engine. As will be appreciated by a person having ordinary skill in the art, engine 252 may drive power transfer device 112. By way of example only, auxiliary device 254 may comprise any power transfer driven device used for various applications, such as assisting in the operation of one or more tools. As a more specific example, auxiliary device 254 may be driven by power transfer device 112 and may comprise a compressor, a pump, or a combination thereof. According to one embodiment, auxiliary device 254 may comprise a pressure vessel configured for loading and unloading water in an oil field.

According to one embodiment of the present invention, processing unit 114 may be configured to "track" a duration of time in which power transfer device 112 is engaged. More specifically, processing unit 114 may be configured to track an amount of time in which a signal is received from electrical relay 104 (i.e., indicating that switch 102 is in a closed configuration and, thus, power transfer device 112 is engaged). Furthermore, an amount of fuel used by a specific vehicle (e.g., a truck) in an "idle" mode may be known. More specifically, for example, one or more tests may be performed on a vehicle to determine an amount of fuel used by the vehicle while operating in an "idle" mode (e.g., during operation of power transfer device 112). It is noted that an amount of fuel used by vehicles may vary vehicle to vehicle (e.g., depending on make, model, year, condition, etc.) and, therefore, it may be beneficial to routinely test each vehicle (e.g., each vehicle of a fleet of vehicles) to determine an amount of fuel used by each vehicle while in an "idle" mode.

In accordance with one embodiment, an amount of fuel used by a vehicle during operation of power transfer device 112 may be determined based on a known amount of time in which power transfer device 112 is engaged and a known amount of fuel used by the vehicle in an idle state (i.e., during operation of power transfer device 112). As a non-limiting example, if tests on a vehicle have determined that a vehicle uses 0.5 gallons of fuel per hour while operating in an idle mode, and transfer device 112 is engaged for two hundred hours during a specific time period (e.g., one month), one hundred gallons of fuel (200 hours*0.5 gallons/hour=100 gallons) for the specific time period may be exempt from road or fuel taxes.

Moreover, system 250 includes an engine control unit 256, which may be part of engine 252. It is noted that engine control unit 256 may also be referred to herein as an "engine control module." According to one exemplary embodiment, processing unit 114 may be configured to receive data from engine control unit 256. By way of example only, processing unit 114 may be configured to receive data from engine control unit 256 concerning an amount of fuel (e.g., a number of gallons of diesel fuel) remaining in an associated vehicle. More specifically, for example, processing unit 114 may query engine control unit 256 for specific data and perform further calculations using the data to generate additional information. As one example, processing unit 114, upon receiving a signal from electrical relay 104 indicating that power transfer device 112 is engaged, may query engine control unit 256 for data concerning an amount of fuel (e.g., a number of gallons of diesel fuel) remaining in an associated vehicle. Further, upon determining that power transfer device 112 has been disengaged (i.e., due to the removal of the signal from electrical relay 104), processing unit 114 may again query engine control unit 256 for additional data concerning the amount of fuel (e.g., a number of gallons of diesel fuel) remaining in the vehicle. Processing unit 114 may then determine an amount of fuel (e.g., a number of gallons of diesel fuel) used during operation of power transfer device 112. It is noted that processing unit 114 may be configured for determining via, for example, engine control unit 256, a total amount of fuel used by an associated vehicle (i.e., with or without PTO device 112 in operation) and an amount of fuel used by the vehicle during operation of power transfer device 112.

Further, processing unit 114 may be configured for conveying data. For example, processing unit 114 may convey data to a remote site, such as a dispatch center, where reports using the information may be generated. As a more specific example, processing unit 114 may convey data concerning an amount of fuel used during operation of power transfer device 112, a duration of time in which power transfer device 112 has been in operation, or both, to a remote site. The data may be used for various purposes, such as in documentation for fuel tax exemptions.

With reference to FIGS. 1-4 and a method 300 illustrated in a flowchart of FIG. 5, a contemplated operation of system 250 will now be described. It is noted that switch 102 may comprise a "normally open" switch. Stated another way, in a default configuration, switch 102 may be "open" and, therefore, electrical relay 104 may be isolated from reference voltage 108. Method 300 may include engaging power transfer device 112 (depicted by numeral 302 in FIG. 5). Power transfer device 112 may be engaged by supplying air, at an adequate amount of pressure, via an air supply and air valve 110, to power transfer device 112. According to one exemplary embodiment, engaging power transfer device 112 may comprise actuating power transfer device 112 and closing switch 102 substantially simultaneously. It is noted that air valve 110 is configured to supply an adequate amount of pressure to close switch 102 and engage power transfer device 112. It is further noted that a user (e.g., a tractor operator) may initiate a process to engage power transfer device 112 and close switch 102 by, for example, adjusting a lever on a vehicle, such as a tractor.

Figure 5:
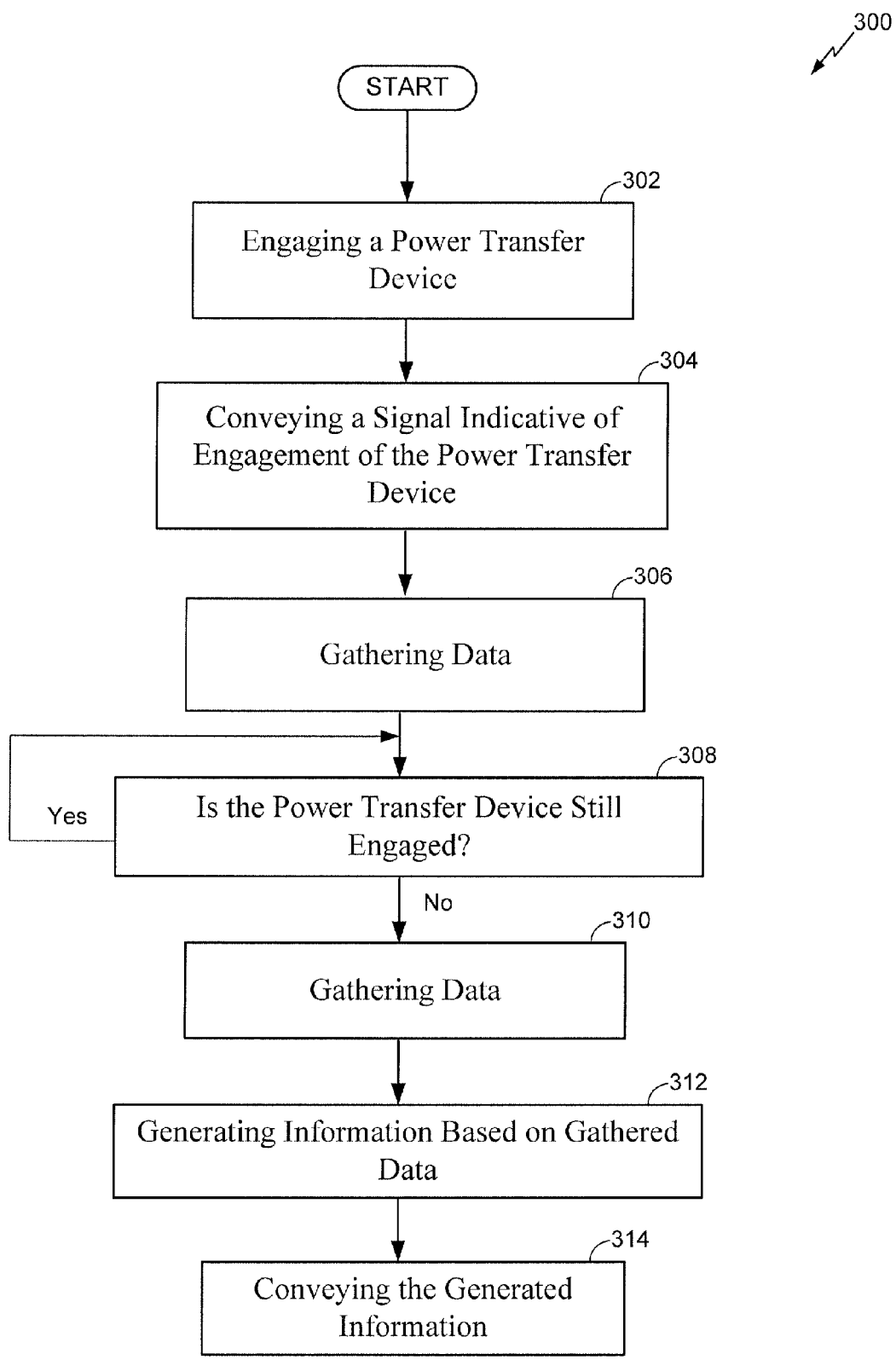
FIG. 5 is a flowchart illustrating a method, in accordance with an exemplary embodiment of the present invention.

Method 300 may also include conveying a signal to processing unit 114 indicating that power transfer device 112 is engaged (depicted by numeral 304 in FIG. 5). As noted above, upon switch 102 coupling electrical relay 104 to reference voltage 108, electrical relay 104 may convey a signal to processing unit 114. Further, upon receipt of the signal, method 300 may include gathering data (depicted by numeral 306 in FIG. 5). It is noted that the step depicted by numeral 302 may comprise tracking data, receiving data, or both. As one example, the step depicted by numeral 306 may include tracking an amount of time that has elapsed during engagement of power transfer device 112. More specifically, upon engagement of power transfer device 112 and, thus receipt of a signal from electrical relay 104, processing unit 114 may begin tracking an amount of time that has elapsed since power transfer device 112 was engaged. As another example, the step depicted by numeral 306 may include receiving data from engine control unit 256 at processing unit 114. For example, the data may include an amount of fuel (e.g., a number of gallons of diesel fuel) remaining in an associated vehicle upon power transfer device 112 being engaged.

Method 300 may also include determining if power transfer device 112 is still engaged (depicted by numeral 308 in FIG. 5). If power transfer device 112 is still receiving the signal from electrical relay 104, it may be determined that power transfer device 112 is engaged. Further, in the event processing unit 114 stops receiving the signal from electrical relay 104, processing unit 114 may determine that power transfer device 112 has become disengaged. If it is determined that power transfer device 112 is disengaged, method 300 may include gathering additional data (depicted by numeral 310 in FIG. 5). It is noted that the step depicted by numeral 310 may comprise tracking data, receiving data, or both. As one example, the step depicted by numeral 310 may include determining an amount of time that elapsed during operation of power transfer device 112. As another example, the step depicted by numeral 310 may include gathering additional data from engine control unit 256 at processing unit 114. For example, the additional data may include an amount of fuel (e.g., a number of gallons of diesel fuel) remaining in the associated vehicle.

Method 300 may further include generating information based on the gathered data (i.e., either data gathered upon engagement of power transfer device 112, data gathered after power transfer device 112 has been disengaged, or both) (depicted by numeral 312 in FIG. 5). By way of example, the generated information may include an amount of time that has elapsed during operation of power transfer device 112, an amount of fuel (e.g., a number of gallons of diesel fuel) used by an associated vehicle during operation of power transfer device 112, or both. Further, method 300 may include conveying the generated information (depicted by numeral 314 in FIG. 5). By way of example only, the generated information may be conveyed to a remote site, such as a dispatch center.

Figure 6:
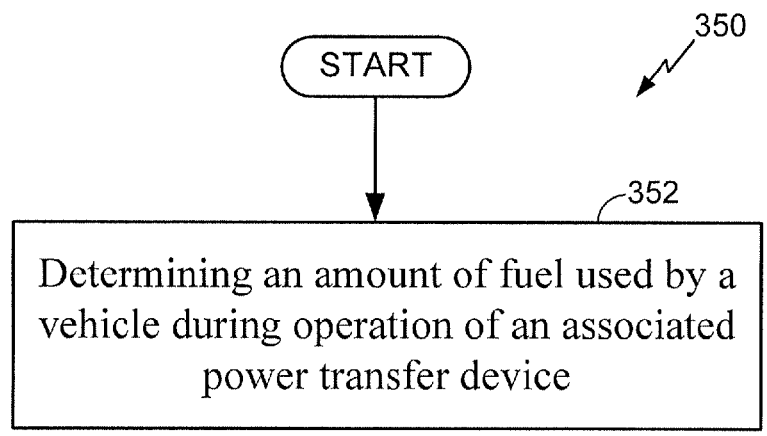
FIG. 6 is flowchart illustrating another method, according to an exemplary embodiment of the present invention.

FIG. 6 is a flowchart illustrating a method 350, in accordance with one or more exemplary embodiments. Method 350 may include determining an amount of fuel used by a vehicle during operation of an associated power transfer device (depicted by numeral 352).

Figure 7:
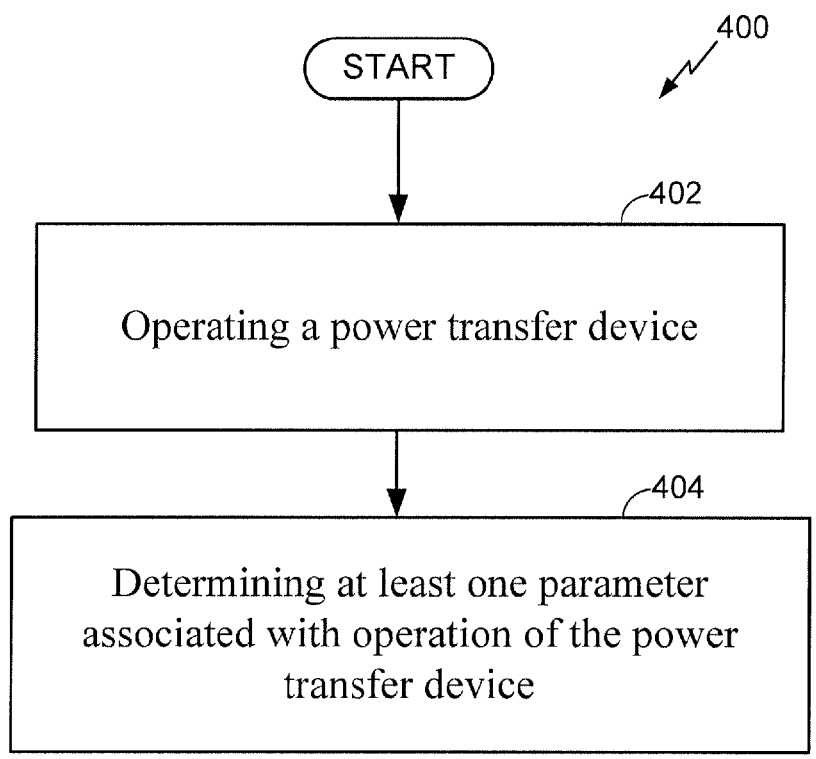
FIG. 7 is a flowchart illustrating another method, in accordance with an exemplary embodiment of the present invention.

FIG. 7 is a flowchart illustrating a method 400, in accordance with one or more exemplary embodiments. Method 400 may include operating a power transfer device (depicted by numeral 402). Method 400 may also include determining at least one parameter associated with operation of the power transfer device (depicted by numeral 404).

Figure 8:
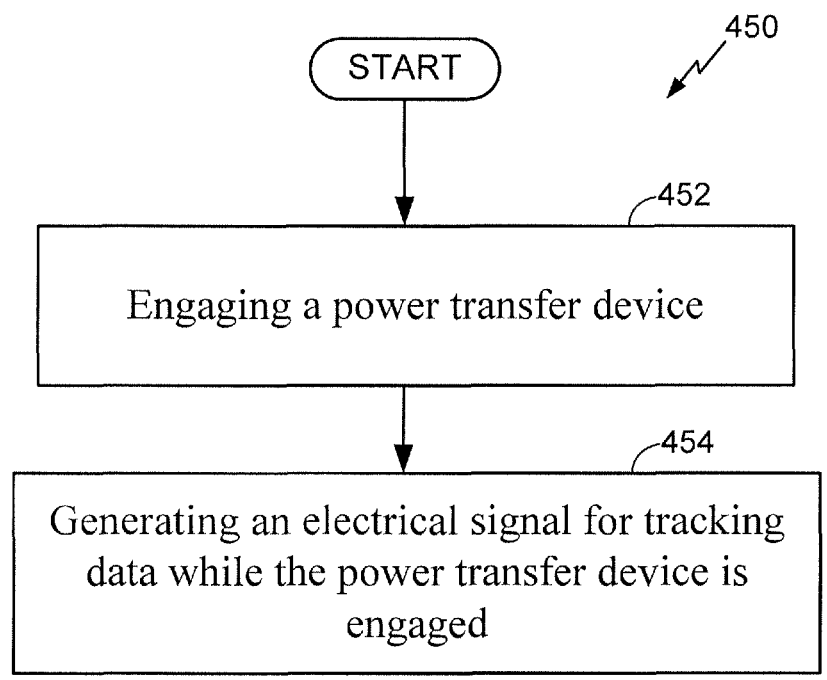
FIG. 8 is a flowchart illustrating yet another method, in accordance with an exemplary embodiment of the present invention.

FIG. 8 is a flowchart illustrating a method 450, in accordance with one or more exemplary embodiments. Method 450 may include engaging a power transfer device (depicted by numeral 452). In addition, method 450 may include generating an electrical signal for tracking data while the power transfer device is engaged (depicted by numeral 454).

Exemplary embodiments of the present invention, as described herein, may enable for electronic tracking of one or more conditions associated with operation of a power transfer device. More specifically, as an example, an amount of fuel used by a vehicle during operation of an associated power transfer device may be determined and recorded. As another example, an amount of time elapsed during operation of a power transfer device may be determined and recorded. Accordingly, embodiments of the present invention provide for systems and methods that may enable for electronic and accurate determination of data, which is associated with operation of a power transfer device, and which may enable for various cost savings measures, such as exemptions related to various fuel taxes.

It is noted that switch 102, electrical relay 104, and processing unit 114, as illustrated in FIGS. 1-4, may be coupled to (e.g., mounted on and/or attached to) a vehicle, a power transfer device, or a combination thereof. It is further noted that the exemplary embodiments described herein may be suitable for vehicles (e.g., tractors or trucks) regardless of make, model, or year.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A system, comprising:
   a power transfer device;
   a switch coupled to each of an electrical relay and a reference voltage and configured to couple the electrical relay to the reference voltage upon engagement of the power transfer device;
   a valve configured to independently engage the power transfer device and enable the switch; and
   a processing unit configured to receive a signal from the electrical relay while the power transfer device is engaged.

2. The system of claim 1, the switch comprising an air pressure electrical switch configured to couple the electrical relay to the reference voltage.

3. The system of claim 1, the processing unit configured to track at least one parameter while the power transfer device is engaged.

4. The system of claim 3, the at least one parameter comprising at least one of an amount of time elapsed during operation of the power transfer device and an amount of fuel used by an associated vehicle during operation of the power transfer device.

5. The system of claim 3, the processing unit configured to transmit information related to the at least one parameter to a remote location.

6. The system of claim 3, the processing unit comprising a global positioning system.

7. The system of claim 3, the switch comprising an air valve adapted to engage the power transfer device and substantially simultaneously configure the switch to couple the electrical relay to the reference voltage.

8. The system of claim 1, further comprising an engine control unit, the processing unit configured to retrieve information from the engine control unit.

9. The system of claim 1, further comprising a power source coupled to the electrical relay.

10. The system of claim 1, further comprising at least one auxiliary device coupled to the power transfer device.

11. A method, comprising:
    engaging a power transfer device with a valve;
    enabling a switch with the valve independent of the power transfer device;
    coupling an electrical relay to a ground voltage via the switch to generate an electrical signal upon a power transfer device being enabled;
    conveying the electrical signal from the electrical relay to a processor while the power transfer device is enabled; and
    electrically isolating the electrical relay from the ground voltage via the switch upon the power transfer device being disabled.

12. The method of claim 11, further comprising determining at least one parameter associated with operation of the power transfer device, the determining at least one parameter comprising determining at least one of an amount of time that has elapsed during operation of the power transfer device and an amount of fuel used by a vehicle during operation of the power transfer device.

13. The method of claim 12, further comprising transmitting information related to the at least one parameter to a remote location.

14. The method of claim 12, further comprising engaging the power transfer device with an air valve.

15. The method of claim 12, the determining comprising configuring a switch to enable a processing unit to receive a signal indicative of power transfer device operation.

16. The method of claim 11, the determining comprising:
determining an amount of fuel in an associated vehicle upon engagement of the power transfer device; and
determining an amount of fuel in the vehicle upon disengagement of the power transfer device.

17. A method, comprising:
enabling a switch in response to pressure from a valve;
activating a power transfer device independent of the switch and in response to pressure from the valve; and
generating an electrical signal in response to the enabled switch to track data while the power transfer device is activated.

18. The method of claim 17, the activating the power transfer device and the generating an electrical signal occurring substantially simultaneously.

19. The method of claim 17, the generating an electrical signal to track data comprising generating the electrical signal to track at least one of an amount of time elapsed during operation of the power transfer device and an amount of fuel used by an associated vehicle during operation of the power transfer device.

20. The method of claim 17, further comprising supplying an adequate amount of air pressure to each of the power transfer device for engagement thereof and an air pressure switch to close the air pressure switch.

21. A system, comprising:
an engine;
a power transfer device coupled to the engine;
a valve independently coupled to each of the power transfer device and a switch and configured to engage the power transfer device and independently enable the switch to generate a signal indicative of the engagement of the power transfer device; and
a processing unit coupled to the engine and configured to determine an amount of fuel used by the engine during engagement of the power transfer device.

22. The system of claim 21, the processing unit further configured to determine a total amount of fuel used by the engine.

* * * * *